United States Patent [19]

Kimura et al.

[11] Patent Number: 5,005,444
[45] Date of Patent: Apr. 9, 1991

[54] HYDRAULIC CONTROL APPARATUS FOR AUTOMATIC TRANSMISSION FOR MOTOR VEHICLE

[75] Inventors: Hiromichi Kimura; Kunihiro Iwatsuki; Hiroji Taniguchi, all of Toyota; Takuji Taniguchi, Okazaki; Kazunori Ishikawa, Toyota, all of Japan

[73] Assignees: Toyota Jidosha Kabushiki Kaisha; Aisin AW Co., Ltd., both of Aichi, Japan

[21] Appl. No.: 313,638

[22] Filed: Feb. 22, 1989

[30] Foreign Application Priority Data

Mar. 7, 1988 [JP] Japan ................... 63-52896

[51] Int. Cl.⁵ ............................................. B60K 41/06
[52] U.S. Cl. .................................... 74/868; 74/866
[58] Field of Search .................... 74/866, 867, 868, 869

[56] References Cited

U.S. PATENT DOCUMENTS

| | | | |
|---|---|---|---|
| 3,738,182 | 6/1973 | Kubo et al. | 74/866 |
| 3,937,108 | 2/1976 | Will | 74/869 X |
| 4,494,423 | 1/1985 | McCarthy et al. | 74/869 |
| 4,693,143 | 9/1987 | Harada et al. | 74/866 |
| 4,697,479 | 10/1987 | Hayakawa et al. | 74/866 X |
| 4,785,689 | 11/1988 | Iwatsuki et al. | 74/866 |

FOREIGN PATENT DOCUMENTS

| | | | |
|---|---|---|---|
| 2029524 | 3/1980 | United Kingdom | 74/867 |
| 2032019 | 4/1980 | United Kingdom | 74/867 |
| 2033985 | 5/1980 | United Kingdom | 74/867 |
| 2164397 | 3/1986 | United Kingdom | 74/867 |

Primary Examiner—Allan D. Herrmann
Assistant Examiner—Benjamin Levi
Attorney, Agent, or Firm—Oliff & Berridge

[57] ABSTRACT

A hydraulic control apparatus for controlling a shifting action of a hydraulically operated frictional coupling device of an automatic transmission connected to a vehicle engine, from a neutral position to a forward drive position, in response to an operation of a shift lever. The apparatus includes a shift control valve operable in response to the shift lever, between a position for supplying a fluid to the coupling device for engagement thereof, and a position for discharging the fluid from the coupling device for disengagement thereof, a flow control device for controlling a rate of flow of the fluid between the shift lever valve and the coupling device, a fail-safe fluid passage disposed between the shift lever valve and the coupling device, for fluid communication between the shift lever valve and the frictional coupling device, irrespective of an operating position of the flow control device, and a controller for controlling the flow control device so as to restrict the fluid flow into or from the coupling device after an engaging or disengaging action of the frictional coupling device is actually started.

15 Claims, 8 Drawing Sheets

FIG. 2

| SHIFT POSITION | | C1 | C2 | C0 | B1 | B2 | B3 | B0 | F1 | F2 | F0 |
|---|---|---|---|---|---|---|---|---|---|---|---|
| P | | | | ○ | | | | | | | |
| R | | | ○ | ○ | | | ○ | | | | |
| N | | | | ○ | | | | | | | |
| D | 1 | ○ | | ○ | | | | | | ◎ | ◎ |
| D | 2 | ○ | | ○ | ○ | | | | ◎ | | ◎ |
| D | 3 | ○ | ○ | ○ | ○ | | | | | | ◎ |
| D | 4 | ○ | ○ | | ○ | | ○ | | | | |
| S | 1 | ○ | | ○ | | | | | | ◎ | ◎ |
| S | 2 | ○ | | ○ | ○ | ○ | | | ◎ | | ◎ |
| S | 3 | ○ | ○ | ○ | ○ | | | | | | ◎ |
| L | 1 | ○ | | ○ | | ○ | | | | ◎ | ◎ |
| L | 2 | ○ | | ○ | ○ | ○ | | | ◎ | | ◎ |

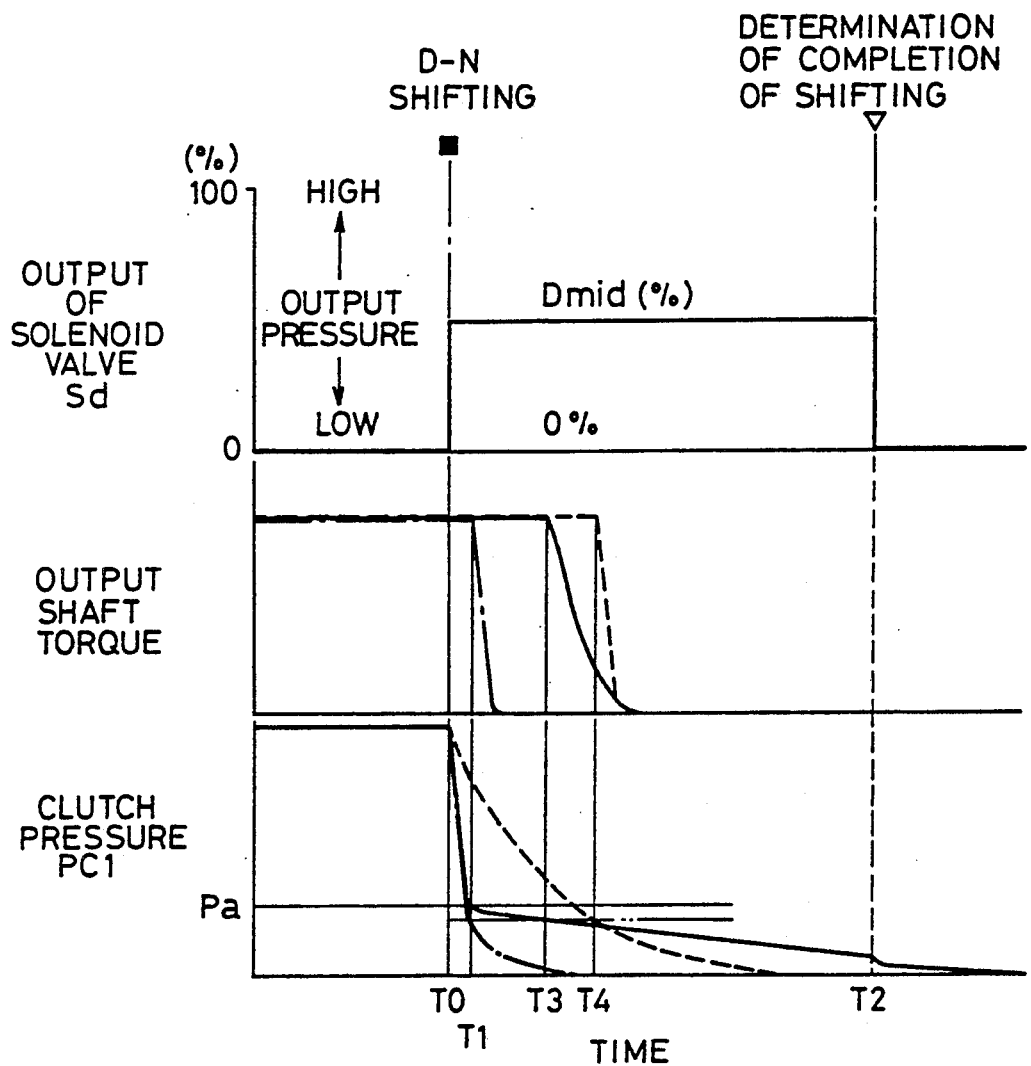

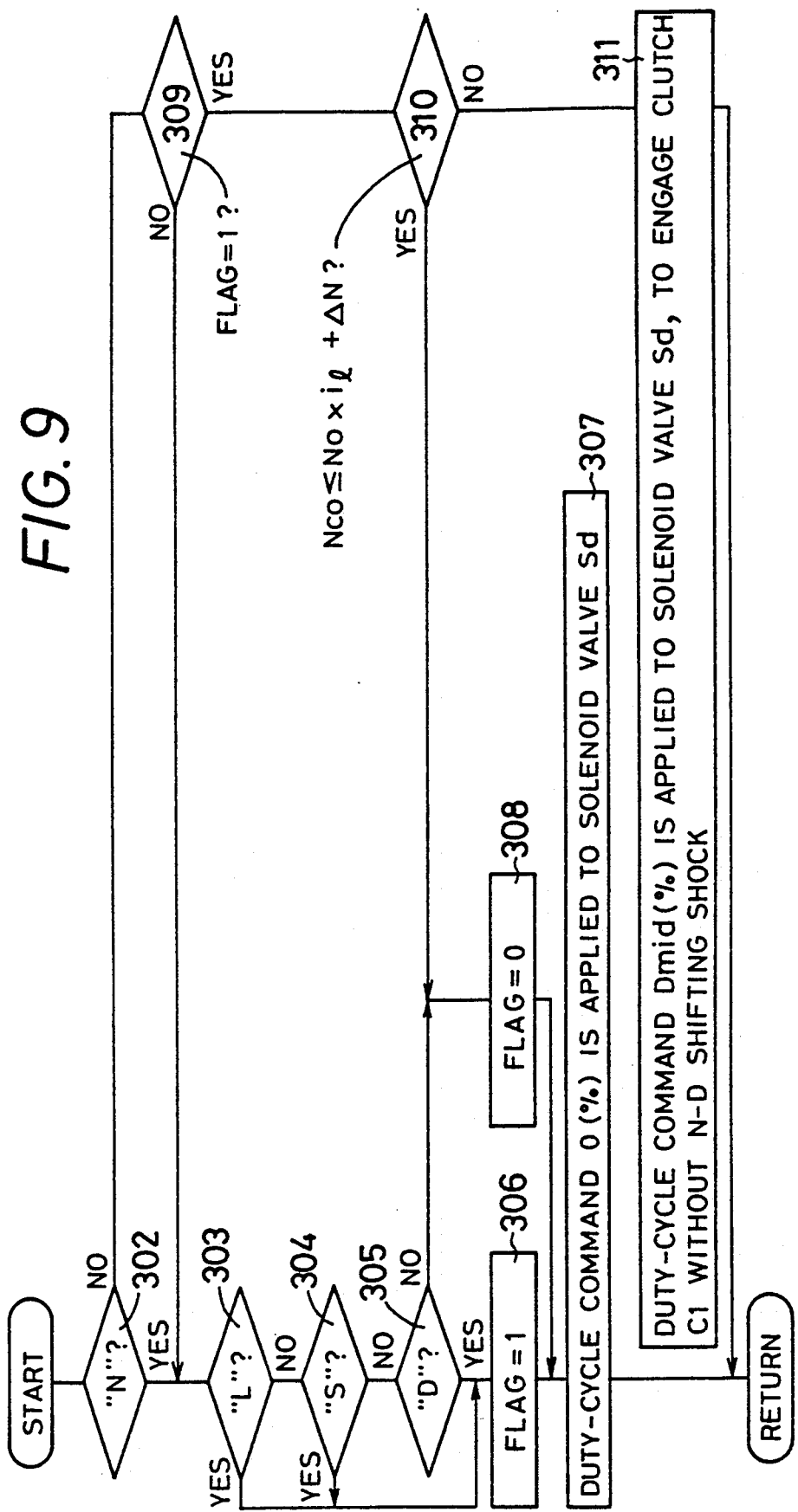

HYDRAULIC CONTROL APPARATUS FOR AUTOMATIC TRANSMISSION FOR MOTOR VEHICLE

BACKGROUND OF THE INVENTION

1. Field of the Invention

The present invention relates generally to a hydraulic control apparatus for a hydraulically operated automatic transmission of an automotive vehicle, and more particularly to improvements in such a hydraulic control apparatus, for controlling a shifting operation of a frictional coupling device of the transmission with a reduced shifting shock, and with increased fail-safe reliability.

2. Discussion of the Prior Art

An automatic transmission for a motor vehicle usually incorporates a frictional coupling device such as a clutch for shifting from a neutral position to a forward drive position (drive position, 1st-speed position, 2nd-speed position, etc.), or vice versa, in response to an operation of a shift lever. A commonly used hydraulic control apparatus for controlling engaging and disengaging operations of such a frictional coupling device employs two fixed flow restrictors, for slowly effecting the engaging and disengaging operations of the frictional coupling device to shift the automatic transmission between the neutral and forward drive positions. One of the flow restrictors is provided with a flow checking ball which prevents a fluid flow in a direction toward the frictional coupling device, so that the rate of flow of the fluid into the coupling device is lower than that of the fluid flow from the coupling device. Thus, the engaging action of the coupling device takes place comparatively slowly.

However, the rate of fluid flow from the frictional coupling device, or the disengaging speed of the coupling device cannot be regulated or restricted. To reduce the shifting shock upon shifting of the transmission to the neutral position, the flow restrictors should have a relatively small cross sectional area of fluid flow. Accordingly, it takes a considerably long time after the shifting to the neutral position is commanded (after the fluid discharge from the coupling device is started), and before the disengaging action of the coupling device is started. Namely, this time lag cannot be reduced without increasing the shifting shock.

In view of the above drawback, a hydraulic control apparatus as shown in FIG. 10 is proposed. This control apparatus is adapted to control a frictional coupling device 6, and includes a shift lever valve 2 operated in response to an operation of a shift lever, and an accumulator 4. When a line pressure PL is produced in a fluid passage 8 by the shift lever valve 2, the line pressure PL is applied to the frictional coupling device 6, through fluid passages 8A and 8B which communicate with each other, and through fluid passages 8C and 8D which also communicate with each other. Therefore, the fluid is supplied to the frictional coupling device 6 at a comparatively high rate. When a piston 4A of the accumulator 4 is moved to a lower position as seen in FIG. 10, the fluid passages 8C and 8D are disconnected, whereby the fluid flows toward the coupling device 6, through the fluid passages 8A and 8B only. Accordingly, the rate of flow of the fluid into the coupling device 6 is lowered, and the coupling device is engaged at a relatively low speed. When the piston of the accumulator 4 is moved to the lowest position, the fluid passages 8C and 8D are again brought into communication with each other, whereby the frictional coupling device 6 is stably maintained in its fully engaged state.

Although the above proposed hydraulic control apparatus is capable of changing the rate of fluid flow between the shift lever valve 2 and the coupling device 6, the rates of fluid flows into and from the coupling device 6 cannot be controlled, independently of each other. That is, the engaging and disengaging operations of the coupling device 6 cannot be controlled independently of each other. Therefore, the degree of freedom to provide a compromise between the shifting speed and the shifting shock is relatively low, or the engaging and disengaging actions cannot be optimally controlled to satisfy the required operating characteristics.

A technique associated with the above problem is disclosed in laid-open Publication No. 48-38574 of examined Japanese Patent Application published for opposition purpose. The disclosed technique lies in the use of a controller for electrically controlling the rate of fluid flow into a frictional coupling device or the rate of increase in the pressure in the coupling device, when the transmission is shifted between the neutral position N and the reverse position R, and between the parking position P and the reverse position R.

When the above technique is applied to the frictional coupling device for shifting the transmission between the neutral position N and the forward drive position D (S, L), the transmission may be shifted to the forward drive position or to the neutral position in the event of some electrical trouble with the controller. Therefore, it is practically difficult or impossible to apply the above technique to the frictional coupling device for shifting the transmission between the neutral and forward drive positions.

SUMMARY OF THE INVENTION

The present invention was developed in view of the problems experienced in the prior art discussed above. It is therefore an object of the present invention to provide a hydraulic control apparatus for controlling a frictional coupling device of an automatic transmission for a motor vehicle, which apparatus permits the frictional coupling device to effect an engaging operation and/or a disengaging operation for shifting the transmission between its neutral and forward drive positions, with a comparatively small shifting shock, and with improved fail-safe reliability.

The above object may be achieved according to the principle of the present invention, which provides a hydraulic control apparatus for controlling a shifting action of a hydraulically operated frictional coupling device of an automatic transmission connected to an engine of a motor vehicle, to shift the automatic transmission between a neutral position thereof and a forward drive position thereof, in response to an operation of a shift lever, with a minimum shifting shock, the hydraulic control apparatus comprising: a shift lever valve operable in response to the shift lever, between a first position for supplying a fluid to the frictional coupling device for engagement thereof, and a second position for discharging the fluid from the frictional coupling device for disengagement thereof; flow control means for controlling a rate of flow of the fluid between the shift lever valve and the frictional coupling device; a fail-safe fluid passage disposed between the shift control valve and the frictional coupling device, for fluid communication between the shift lever valve and the frictional control valve, irrespective of an operating position of the flow control means; and electronic control means for controlling the flow control means so as to restrict the fluid flow into or from the frictional coupling device after an engaging or disengaging action of the frictional coupling device is actually started.

In the hydraulic control apparatus of the present invention, the flow control means disposed in a fluid passage leading to the frictional coupling device for establishing the forward drive position is operated under the control of a command produced by the electronic control means, such that the rate of fluid flow into the coupling device and/or the rate of fluid flow from the coupling device is/are restricted while the torque transmitted by the coupling device is changed. Consequently, the engaging action and/or the disengaging action of the coupling device can be accomplished, with a relatively reduced shifting shock, and with a relatively shortened time lag between the moment when the shift lever is operated and the moment when a change in the transmission torque of the coupling device is actually started.

Further, the frictional coupling device is always held in communication with the shift lever valve, through the fail-safe fluid passage, irrespective of the operating position of the flow control means. Therefore, the frictional coupling device may be operated to establish the neutral or forward drive position, even in the event of an electrical or electronic failure or mulfunction of the electronic control means, or some trouble with the flow control means such as sticking of a valve spool. Certainly, the rate of fluid flow through the fail-safe fluid passage is determined in relation to the rate of fluid flow through the flow control means which is controlled by the control means.

It is noted that the rates of fluid flow into and from the coupling device may be considered equivalent to the rates of increase and decrease of the pressure in the coupling device, which determine the speeds at which the coupling device is engaged and disengaged, or the speeds at which the transmission is shifted between the forward drive position and neutral position.

In one form of the invention, the fail-safe fluid passage comprises at least one of a first and a second fluid passage which are disposed in parallel connection with each other, between the shift lever valve and the frictional coupling device. The second fluid passage has a larger cross sectional area of the fluid flow than the first fluid passage. In this case, the first fluid passage may include a first fixed flow restrictor, and a second fixed flow restrictor equipped with flow checking means.

In one arrangement of the above form of the invention, the flow control means is operated according to a command from the electronic control means, so as to regulate the rate of fluid flow through the second fluid passage, and thereby restrict the rate of fluid flow into and from the frictional coupling device, while a torque transmitted by the frictional coupling device is changed. In this instance, the flow control means may include a flow control valve for controlling the rate of fluid flow through the second fluid passage, and a linear solenoid valve for producing a controlled output pressure which is regulated by the command from the electronic control means, for operating the flow control valve. The flow control valve may include a spool which has an intermediate position between opposite ends of an operating stroke thereof. The flow control valve is adapted to restrict the rate of fluid flow through the second fluid passage when the spool is placed in the intermediate position, and not restrict the rate of fluid flow when the spool is placed in one of two end positions corresponding to the opposite ends. The linear control apparatus may be operated with a duty cycle thereof being controlled by the command from the electronic control means. The electronic control means may be adapted to control the linear solenoid valve such that the linear solenoid valve is operated with a predetermined duty cycle which is determined by a stored predetermined relationship between the duty cycle and a throttle valve opening. A third flow restrictor may be disposed between the frictional control device and the flow control valve. In this case, an accumulator may be connected to a passage between the third flow restrictor and the flow control valve.

The automatic transmission may include a plurality of planetary gear mechanisms having a plurality of clutches. The frictional coupling device consists of one of the clutches which is engaged when the shift lever is operated to a position corresponding to the forward drive position of the transmission, and disengaged when the shift lever is operated to a position corresponding to the neutral position of the transmission.

BRIEF DESCRIPTION OF THE DRAWINGS

The above and other objects, features and advantages of the present invention will be better understood by reading the following detailed description of presently preferred embodiments of the invention, when considered in connection with the accompanying drawings, in which:

FIG. 2 is a view illustrating different operating conditions of the automatic transmission;

FIG. 6 is a time chart indicating operating characteristics of a clutch of the transmission, according to the hydraulic control apparatus of FIG. 1 and the conventional apparatus;

FIG. 9 is a flow chart showing a control routine according to another embodiment of the invention.

DETAILED DESCRIPTION OF THE PREFERRED EMBODIMENT

Figure 1:
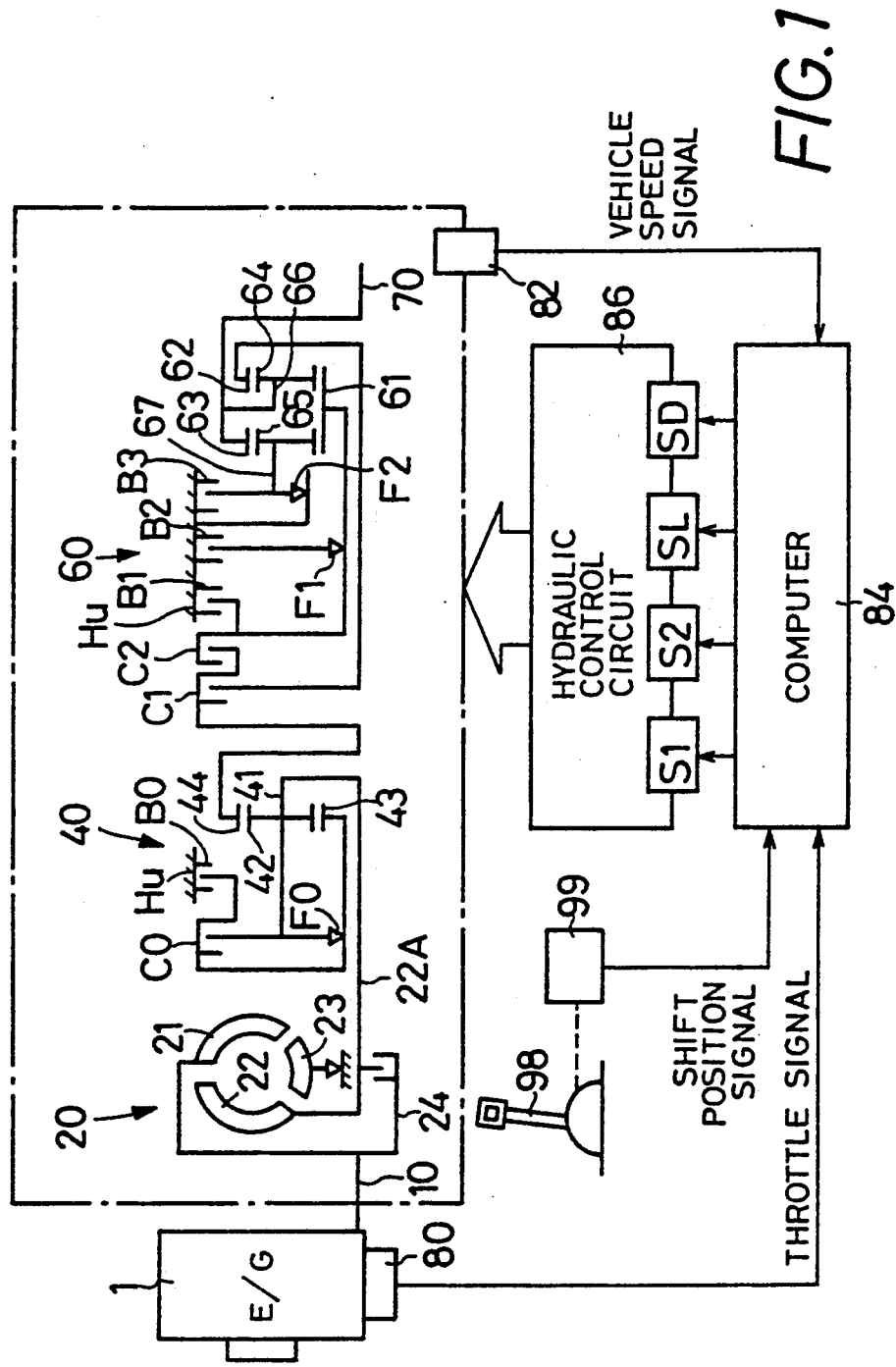
FIG. 1 is a schematic block diagram showing an example of an automatic transmission for a motor vehicle, and one embodiment of a hydraulic control apparatus of the present invention for controlling the automatic transmission.

Referring first to FIG. 1, there is shown a power transmitting system of an automotive vehicle, which includes a hydraulically operated automatic transmission, and a hydraulic control apparatus constructed according to one embodiment of the invention for controlling the automatic transmission.

The automatic transmission illustrated in a block of one-dot chain line in FIG. 1 includes a torque converter 20, an overdrive mechanism 40, and an underdrive mechanism 60 which has three forward drive positions "1" (1st-speed position), "2" (2nd-speed position), and "3" (3rd-speed position), and one rear drive position "R", as shown in FIG. 2. These three forward drive positions "1", "2" and "3" are established while a manually operated shift lever is placed in one of three positions "L", "S" and "D", with the overdrive mechanism 40 placed in its off position. When the overdrive mechanism 40 is placed in its on position, a fourth forward drive position "4" (4th-speed position) may be established when the manual shift lever is in the position "D".

The torque converter 20 consists of a well known arrangement which is provided with a pump impeller 21, a turbine impeller 22, a stator 23 and a lockup clutch 24.

The overdrive mechanism 40 incorporates a single planetary gear unit consisting of a sun gear 43, a ring gear 44, a planetary pinion 42, and a carrier 41. This planetary gear unit is controlled by a clutch C0, a brake B0 and a one-way clutch F0.

The underdrive mechanism 60 incorporates two planetary gear units which use a common sun gear 61. The first planetary gear unit includes the sun gear 61, a ring gear 62, a planetary pinion 64 and a carrier 66, while the second planetary gear unit includes the sun gear 61, a ring gear 63, a planetary pinion 65 and a carrier 67. The operating condition of these two planetary gear units, and their connection with the overdrive mechanism 40 are controlled by clutches C1, C2, brakes B1-B3 and one-way clutches F1, F2.

Since the automatic transmission indicated above is well known in the art and is schematically illustrated in FIG. 1, no further description thereof is deemed necessary for understanding the principle of the present invention.

Each of the clutches C1, C2 and brakes B1, B2, B3 of the underdrive mechanism 60 is a frictional coupling device of the instant automatic transmission.

The hydraulic control apparatus for controlling the automatic transmission includes a hydraulic control circuit 86, and a hydraulic control device in the form of a computer 84. The computer 84 receives a THROTTLE signal from a throttle sensor 80, a VEHICLE SPEED signal from a vehicle speed sensor 82, and a SHIFT POSITION signal from a shift position sensor 99. The THROTTLE signal represents a throttle opening $\theta$ of a throttle valve of the engine 1, which indicates a currently required output (torque) of the engine 1. The VEHICLE SPEED signal represents a running speed No of the vehicle, and the SHIFT POSITION signal represents a currently selected position (NEUTRAL position N, REVERSE position R, PARKING position P, DRIVE position D, SECOND-SPEED position S, and FIRST-SPEED position L, as indicated in FIG. 2) of the manually operated shift lever.

The hydraulic control circuit 86 includes solenoid-operated shift valves S1, S2 for operating the brake B2 and clutch C2 of the underdrive mechanism 60, and a solenoid-operated valve SL for operating the lockup clutch 24 of the torque converter 20. In response to the THROTTLE, VEHICLE SPEED and SHIFT POSITION signals, the computer 84 controls the solenoid-operated valves S1, S2, and SL, according to a predetermined relation between the throttle opening $\theta$ and the vehicle speed No, for controlling the clutches C0–C2, brakes B0–B3 and one-way clutches F0–F2, so as to establish one of the operating positions of the transmission as indicated in FIG. 2.

It will be understood from FIG. 2 that the clutch C1 is engaged for establishing the forward drive positions "1", "2", "3" and "4". The principle of the present invention applies to this clutch C1, i.e., frictional coupling device C1.

Figure 3:
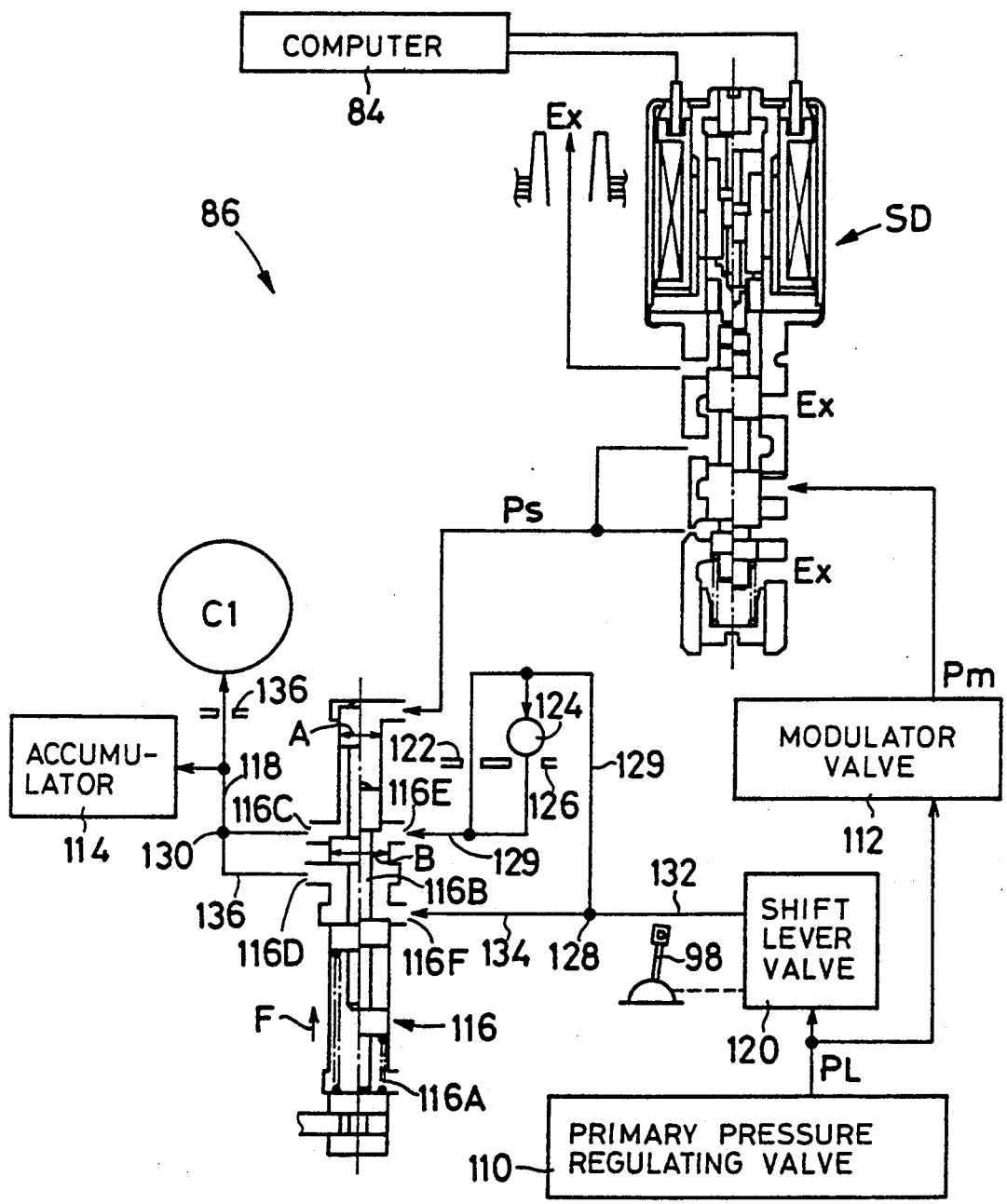
FIG. 3 is a fragmentary view of a hydraulic control circuit including a restrictor control valve 116 which is incorporated in the hydraulic control apparatus.

Referring to FIG. 3, there is shown a part of the hydraulic control circuit 86, which is adapted to control the clutch C1 for establishing the forward drive positions.

In FIG. 3, reference numeral 110 denotes a primary pressure regulating valve for regulating the pressure of a pressurized fluid delivered from a hydraulic pump (not shown), to a line pressure PL. The line pressure PL is applied to a modulator valve 112, which reduces the line pressure PL to a predetermined pressure Pm. This pressure Pm is applied to a duty-cycle controlled, linear solenoid valve Sd, which operates at a controlled duty cycle commanded by the computer 84, to regulate the received pressure Pm to a controlled pressure Ps.

The line pressure PL is also applied to a shift lever valve 120 which is mechanically linked with the shift lever 98. The shift lever valve 120 is connected to a flow control valve 116 through fluid passages 132, 134. The flow control valve 116 is connected to the clutch C1 of the underdrive mechanism 60, through a fluid passage 118. When the shift lever 98 is shifted from the NEUTRAL position N to the DRIVE position D, the shift lever valve 120 applies the line pressure PL to the flow control valve 116 through the passages 132, 134. When the shift lever 98 is shifted from the DRIVE position D to the NEUTRAL position N, the line pressure PL is discharged into a drain line.

The flow control valve 116 has a spool 116B biased upwardly by a spring 116A, and ports 116C, 116D, 116E and 116F. The spool 116B has an uppermost land whose pressure-receiving surface has a cross sectional area A, and a second land whose pressure-receiving surface has a cross sectional area B, as indicated in FIG. 3. The flow control valve 116 receives the pressure Ps controlled by the linear solenoid valve Sd, and a transient pressure PC1 of the clutch C1. These pressures Ps and PC1 act on the spool 116B, in a downward direction as seen in FIG. 3. Thus, an equilibrium of forces acting on the spool 116B is expressed by the following equation:

$$Ps \cdot A + PC1 \cdot (B-A) = F$$

where, F: Biasing force of the spring 116A

The spool 116B is moved up and down according to the above equation, so that the fluid communication between the ports 116C and 116E, and the fluid communication between the ports 116D and 116F are controlled so as to regulate the flow of the fluid to and from the clutch C1.

The fluid passage 132 is connected to the fluid passage 134 and a fail-safe fluid passage 129, through a T-connector 128. The fail-safe fluid passage 129 has a first fixed flow restrictor 122, and a second fixed flow restrictor 126 in parallel connection with the first flow restrictor 122. The second flow restrictor 126 is provided with a check ball 124. The fail-safe passage 129 is connected to the port 116E of the flow control valve 116. The second flow restrictor 126 has a larger cross sectional area of fluid flow than the first flow restrictor 122.

The fluid passage 134 in parallel connection with the fail-safe fluid passage 129 is connected directly to the port 116F of the flow control valve. Therefore, the passage 134 has a lower fluid flow resistance than that of the passage 129 provided with flow restrictors 122, 124. The ports 116C and 116D are connected to a T-connector 130, which is connected to the clutch C1 through the fluid passage 118. The fluid passage 118 has a third flow restrictor 136. The fluid passage 118 is connected to an accumulator 114, so that the fluid flow from the passage 118 into the clutch C1 is restrained for a given period of time, as usually practiced in the art.

There will be described an operation of the instant hydraulic control apparatus, for controlling the engaging action of the clutch C1.

When the spool 116B of the flow control valve 116 is placed in the position indicated at left in FIG. 3, the ports 116C and 116E are held in communication with each other, while the ports 116D and 116F are held in communication with each other. In this condition, the fluid flows into or out of the clutch C1, through the two passage systems 116C-116E and 116D-116F of the flow control valve 116, whereby the rate of flow of the fluid through the valve 116 is maintained at a first valve.

While the fluid is supplied to the clutch C1, the second flow restrictor 126 is closed by the check ball 124. The second flow restrictor 126 is open while the fluid is discharged from the clutch C1. Accordingly, the fluid is fed into the clutch C1 at a relatively low rate, while the fluid is discharged from the clutch C1 at a relatively high rate. In other words, the clutch C1 is slowly engaged, and rapidly disengaged.

The fluid flow through the flow control valve 116 is effected through the two passage systems 116C-16E and 116D-116F, also when the spool 116B is placed in the position indicated at right in FIG. 3. Thus, the clutch C1 is operated in the same manner as described above, with respect to the position of the spool 116B indicated at left.

Figure 4:
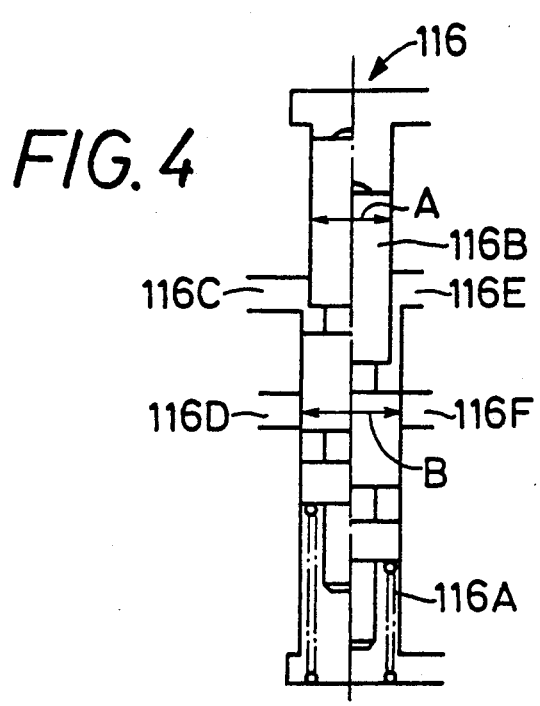
FIG. 4 is a schematic view showing the restrictor control valve.

While the spool 116B of the flow control valve 116 is placed in its intermediate position of FIG. 4 between the left and right positions of FIG. 3, the fluid communication between the ports 116D and 116F is disconnected, and the fluid flows through only the passage system 116C-116E, whereby the fluid flow through the valve 116 is accordingly restricted to a second value smaller than the first value indicated above. Consequently, the clutch C1 is operated at a relatively low speed, with the fluid being supplied and discharged into and from the clutch C1 at relatively low rates.

As described above, the ports 116C and 116E of the flow control valve 116 for the clutch C1 are always held in communication with each other, irrespective of the position of the spool 116B.

The position of the spool 116B is controlled by the controlled output pressure Ps of the duty-cycle controlled linear solenoid valve Sd. Namely, the duty cycle of the solenoid valve Sd is controlled by a command produced by the computer 84.

Figure 5:
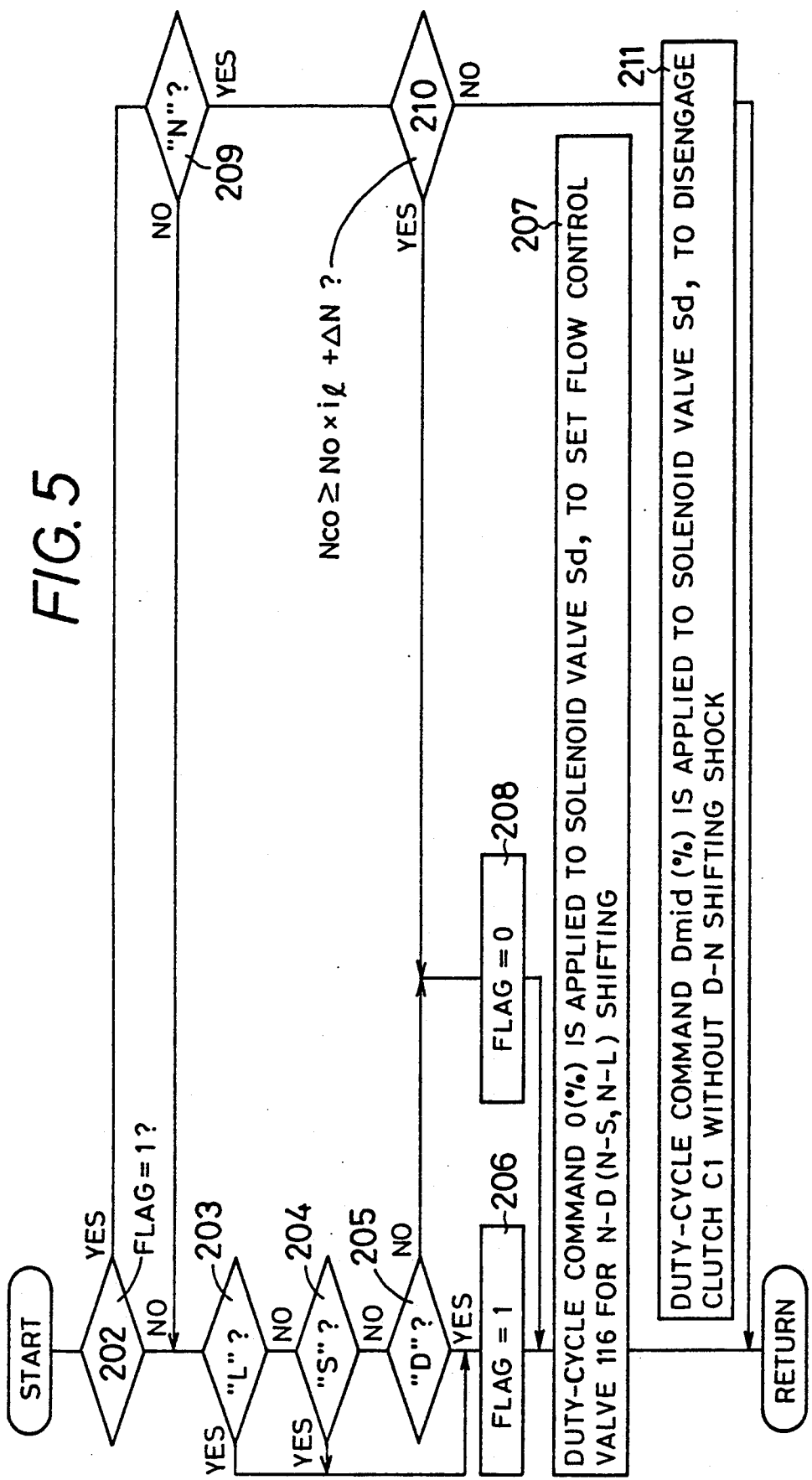
FIG. 5 is a flow chart showing a control routine executed by a computer of the hydraulic control apparatus, for controlling shifting operation of the automatic transmission.
Figure 10:
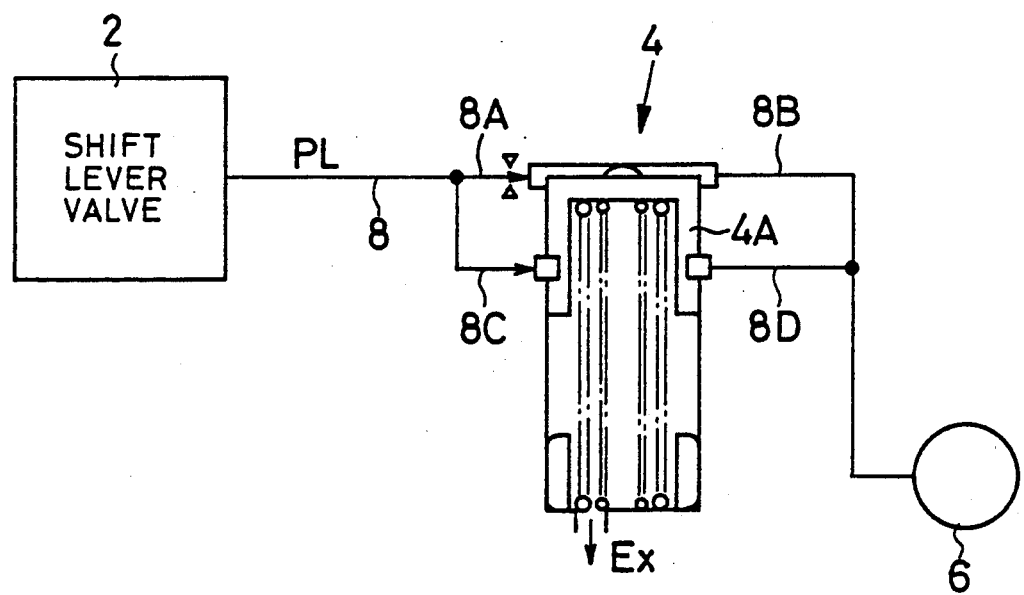
FIG. 10 is a fragmentary schematic view showing a known hydraulic control apparatus.

Referring to the flow chart of FIG. 5, there is illustrated a control routine which is executed by the computer 84 for controlling the solenoid valve Sd when the shift lever 98 is shifted from the DRIVE position D to the NEUTRAL position N (when the D-N shift of the shift lever is effected).

Initially, the control flow goes to step 202 to determine whether a control flag is "1" or not. This flag is set at "1" when the shift lever 98 is currently placed in any one of the forward drive positions, D (DRIVE), S (SECOND-SPEED) and L (FIRST-SPEED), or when a duty cycle command for the shifting from the DRIVE position D to the NEUTRAL position N is present at the solenoid valve Sd. The flag is reset to "0" when the shift lever 98 is moved to any position other than the forward drive positions D, S, L, or when the duty cycle command for the D-N shifting becomes absent.

Figure 7:
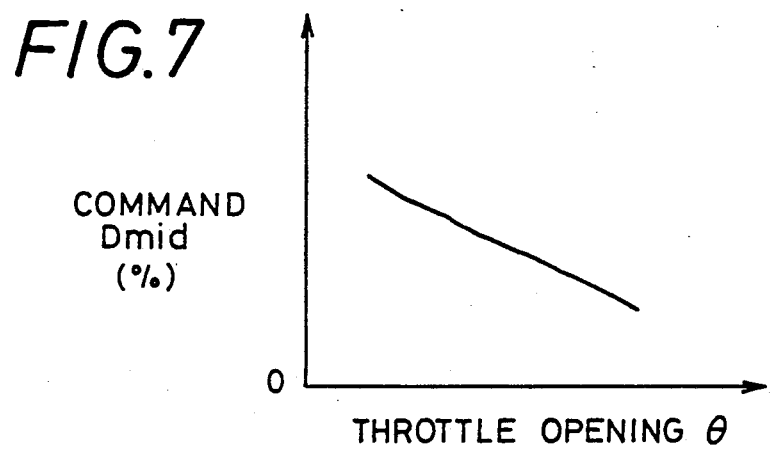
FIG. 7 is a graph indicating a relationship used in the control routine of FIG. 5, for determining a commanded duty cycle of a linear solenoid valve used in the hydraulic control apparatus.
Figure 8:
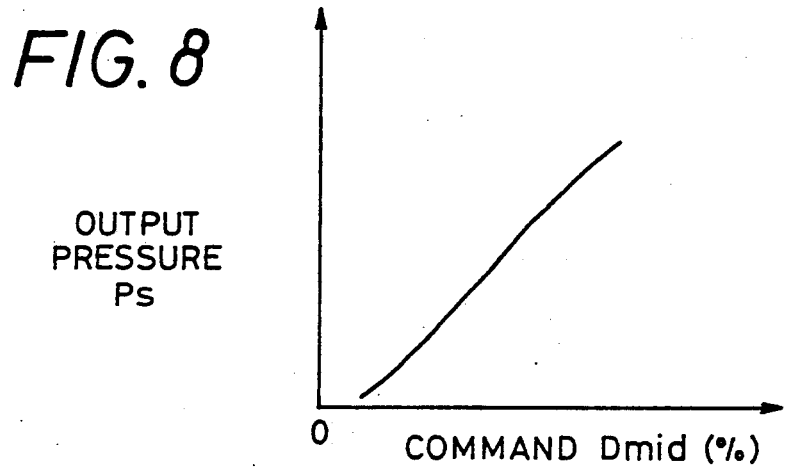
FIG. 8 is a graph indicating a relationship between the commanded duty cycle of the linear solenoid valve and its output pressure.

When the control flag is not "1", steps 203, 204 and 205 are executed to determine whether any one of the forward drive positions D, S, L is currently selected. When a negative decision (NO) is obtained in all of these three steps 203, 204, 205, the control flow goes to step 208 in which the control flag is maintained at "0". Step 208 is followed by step 207 wherein a duty-cycle command 0(%) is applied from the computer 84 to the solenoid valve Sd, whereby the duty cycle of the solenoid valve Sd is set to 0%. In other words, the solenoid of the linear solenoid valve Sd is placed in its off or deenergized state. Consequently, the output pressure Ps is zeroed, and the position of the spool 116B of the flow control valve 116 is determined by an equilibrium between a force corresponding to the clutch pressure PC1 and the biasing force F of the spring 116A, whereby the spool 116B is moved to the left position of FIG. 4, for operating the clutch C1 to shift the automatic transmission from the NEUTRAL position N to the DRIVE position D.

Where an affirmative decision (YES) is obtained in step 202 (where the control flag is "1"), step 209 is executed to determine whether the shift lever 98 is placed in the NEUTRAL position N or not. If not, step 209 is followed by step 203. If the shift lever 98 is placed in the NEUTRAL position N, step 210 is executed. This is the case where the shift lever 98 is shifted to the NEUTRAL position N after it was placed in any one of the forward drive positions D, S, L (after the control flag was set to "1"). In this case, therefore, step 211 is implemented to control the linear solenoid valve Sd so as to control the flow control valve 116, for operating the clutch C1 to shift the automatic transmission to the NEUTRAL position N. Step 211 is preceded by step 210 for determining whether the operation in step 210 is completed or not, i.e., whether the following inequality is satisfied or not:

$$Nco \geq No \times iL + \Delta N$$

where,
 Nco: Rotating speed of the drum of the clutch C0
 No: Rotating speed of the output shaft of the automatic transmission
 iL: Gear ratio of the 1st-gear position of the automatic transmission
 $\Delta N$: Predetermined small value Described more specifically, step 211 is repeatedly executed until the above inequality is satisfied, i.e., until an affirmative decision (YES) is obtained in step 210. In step 211, a duty-cycle command Dmid(%) is applied from the computer 84 to the linear solenoid valve Sd, for shifting the transmission from the forward drive position D, S, L to the NEUTRAL position N, so as to reduce the shifting shock of the transmission. The duty-cycle command Dmid(%) is determined to control the output pressure Ps of the solenoid valve Sd so that the spool 116B of the flow control valve 116 is placed in its intermediate position between the left and right positions of FIG. 3, without the pressure Pcl of the clutch C1 applied to the spool 116B. For example, the duty-cycle command Dmid(%), i.e., the duty cycle of the solenoid valve Sd is determined according to a predetermined relationship between the duty cycle percentage and the throttle opening represented by the THROTTLE signal from the throttle sensor 80, as indicated in FIG. 7. This relationship is stored in the computer 84. In this case, the duty cycle of the solenoid valve Sd and the output pressure Ps are changed with the throttle opening, as indicated in FIG. 8. However, the amount of operation of the accelerator pedal may be used in place of the throttle opening.

When the inequality of step 210 is satisfied, the control flow goes to step 208 in which the control flag is reset to "0". Then, step 207 is executed whereby the duty cycle of the linear solenoid valve Sd is set to 0%. As a result, the spool 116B of the flow control valve 116 is moved to the left position of FIG. 3, by the biasing force F of the spring 116A. Therefore, the fluid is discharged from the clutch C1 through both of the ports 116C and 116D. Thus, the pressure in the clutch C1 is zeroed.

When the control flow goes to step 210, that is, when the shift lever 98 is shifted from the DRIVE position D to the NEUTRAL position N, for example, the duty cycle command Dmid(%) is generated from the computer 84. As a result, the fluid is discharged from the clutch C1 through both of the ports 116C and 116D at a relatively high rate, for a period T0-T1 during which the pressure Pcl in the clutch C1 is higher than a predetermined level Pa, as indicated in solid line in FIG. 6. The predetermined level Pa is determined depending upon the duty-cycle command Dmid(%).

When the pressure Pcl is lowered below the predetermined level Pa, the fluid is discharged from the clutch C1 through the port 116C only, at a relatively low rate, whereby the pressure Pcl is smoothly lowered at a relatively low rate, for a period T1-T2, whereby the automatic transmission is shifted to the NEUTRAL position N, with a reduced shifting shock. The flow restriction by the flow control valve 116 is continued until the clutch C1 is completely disengaged, that is, until the inequality in step 210 is satisfied at the time T2. Subsequently, the duty cycle of the solenoid valve Sd is zeroed (0%), and the residual pressure Pcl in the clutch C1 is zeroed.

Broken lines in FIG. 6 indicate the characteristics where the fluid flow is restricted by a conventional flow restrictor device. In this case, a time lag T0-T4 between the commencement of lowering of the clutch pressure Pcl and the commencement of reduction of the output shaft torque is relatively long, and the output shaft torque is rapidly reduced at a considerably high rate. Therefore, the transmission is shifted to the NEUTRAL position N with a relatively large shock. If the rate of discharge flow of the fluid from the clutch C1 is increased according to the conventional flow restrictor device, as indicated in one-dot chain line in FIG. 6, the time lag T0-T1 is relatively short, but the rate of reduction of the output shaft torque is further increased, with a result of increasing the shifting shock.

Where the transmission is shifted to the NEUTRAL position N according to the instant hydraulic control arrangement, the clutch pressure Pcl is considerably rapidly lowered down to the level Pa, and is thereafter lowered at a low rate until the clutch C1 is fully disengaged. In this case, the time lag is T0-T3, which is shorter than the time lag T0-T4 of the conventional arrangement. Further, the output shaft torque of the transmission may be reduced at a sufficiently low rate, whereby the shifting shock is substantially eliminated.

It is noted that the fail-safe fluid passage 129 incorporating the first and second flow restrictors 122, 126 permits the clutch C1 to be engaged and disengaged in response to the operation of the shift lever 98, even if the flow control valve 116 is locked in its left or right position of FIG. 3 or in any intermediate position of FIG. 4, due to a failure of the computer 84 or linear solenoid valve Sd, or due to sticking of the spool valve 116B. Namely, the fail-safe fluid passage 129 keeps the clutch C1 in fluid communication with the shift lever valve 120.

While the instant embodiment uses flow control means which consists of the flow control valve 116, linear solenoid valve Sd, and first and second flow restrictors 122, 126, the flow control means may be suitably modified according to the principle of the present invention, provided that the rate of flow of the fluid into and from the frictional coupling device or clutch C1 may be changed during an engaging and a disengaging action of the clutch C1, and provided that the flow control means is equipped with a suitable fail-safe fluid passage.

Further, the inequality used in step 210 may be replaced by any other condition. For instance, the rotating speed of the engine 1 is monitored, or the time duration after the operation of the shift lever 98 is measured, to determine that the disengagement of the clutch C1 is substantially completed.

While the operation of the hydraulic control apparatus has been described above with respect to the shifting of the transmission from the DRIVE position D to the NEUTRAL position N, by way of example, the principle of the invention is applicable to the shifting from the NEUTRAL position N to the DRIVE, SECOND or FIRST position D, S, L. The flow chart of FIG. 9 shows a control routine when the shift lever 98 is shifted from the NEUTRAL position to the DRIVE position. In this case, the clutch C1 is slowly engaged with the fluid being supplied thereto at a sufficiently low rate, whereby the shifting shock of the transmission is substantially eliminated.

While the transmission controlled by the hydraulic control apparatus described above uses the planetary gear mechanisms 40, 60, the principle of the invention is applicable to a clutch in an auxiliary transmission unit of a power transmission system which uses a belt-and-pulley type continuously variable transmission, as disclosed in U.S. Pat. No. 4,685,358.

It is to be understood that other changes, modifications may be made in the invention, without departing from the spirit and scope of the invention defined in the following claims.

What is claimed is:

1. A hydraulic control apparatus for controlling a shifting action of a hydraulically operated frictional coupling clutch of an automatic transmission connected to an engine of a motor vehicle, to shift the automatic transmission between a neutral position thereof and a first-speed forward drive position, in response to an operation of a shift lever, with a minimum shifting shock, said clutch being engaged to establish said first-speed position, said hydraulic control apparatus comprising:

a shift lever valve operable in response to the operation of said shift lever between a first position for supplying a fluid to said fractional coupling clutch for engagement thereof to establish said first-speed forward drive position and a second position for discharging the fluid from the frictional coupling clutch for disengagement thereof;

flow control means lever valve and said frictional coupling clutch, for controlling a rate of flow of the fluid therethrough;

a fail-safe fluid passage disposed between said shift lever valve and said frictional coupling clutch for always maintaining fluid communication between the shift lever valve and the frictional coupling clutch irrespective of an operating position of said flow control means and even in the event of a trouble with said flow control means; and electronic control means for controlling said flow control means so as to restrict the rate of fluid flow into or from said frictional coupling clutch after an engaging or disengaging action of said frictional coupling clutch is actually started and while a torque transmitted by the frictional coupling clutch is changed.

2. A hydraulic control apparatus according to claim 1, further comprising a first and a second fluid passage which are disposed in parallel connection with each other, between said shift lever valve and said frictional coupling clutch, one of said first and second fluid passages comprising said fail-safe fluid passage.

3. A hydraulic control apparatus according to claim 2, wherein said one of the first and second fluid passages includes a first fixed flow restrictor and a second fixed flow restrictor equipped with flow checking means.

4. A hydraulic control apparatus according to claim 2, wherein said flow control means is operated to a restricting position according to a command from said electronic control means, so as to restrict the rate of fluid flow through the other of said first and second fluid passages, and thereby restrict the rate of fluid flow into and from said frictional coupling clutch, while said torque transmitted by the frictional coupling clutch is changed.

5. A hydraulic control apparatus according to claim 3, wherein said one of the first and second fluid passages includes a portion which is formed through said flow control means.

6. A hydraulic control apparatus according to claim 5, wherein said portion of said one fluid passage includes two ports which are held in communication with each other, irrespective of the operating position of said flow control means of said plurality of clutches which is engaged when said shift lever is operated to a position corresponding to said first-speed forward drive position of the transmission, and disengaged when the shift lever is operated to a position corresponding to said neutral position of the transmission.

7. A hydraulic control apparatus according to claim 1, wherein said automatic transmission includes a plurality of planetary gear mechanisms having a plurality of clutches, and said frictional coupling clutch for establishing said first-speed forward drive position consists of one 8. A hydraulic control apparatus for controlling a shifting action of a hydraulically operated frictional coupling clutch of an automatic transmission connected to an engine of a motor vehicle, to shift the automatic transmission between a neutral position thereof and a first-speed forward drive position, in response to an operation of a shift lever, with a minimum shifting shock, said clutch being engaged to establish said first-speed position, said hydraulic control apparatus comprising:

a shift lever valve operable in response to the operation of said shift lever between a first position for supplying a fluid to said frictional coupling clutch for engagement thereof to establish said first-speed forward drive position and a second position for discharging the fluid from the frictional coupling clutch for disengagement thereof;

flow control means disposed between said shift lever valve and said frictional coupling clutch for controlling a rate of flow of the fluid therethrough;

a fail-safe fluid passage disposed between said shift lever valve and said frictional coupling clutch for maintaining fluid communication between the shift lever valve and the frictional coupling clutch irrespective of an operating position of said flow control means;

electronic control means for controlling said flow control means so as to restrict the rate of fluid flow into or from said frictional coupling clutch after an engaging or disengaging action of said frictional coupling clutch is actually started; and a first and a second fluid passage which are disposed in parallel connection with each other, between said shift lever valve and said frictional coupling clutch, one of said first and second fluid passages comprising said fail-safe fluid passage, said electronic control means applying a command to said flow control means, so as to regulate the rate of fluid flow through the other of said first and second fluid passages, and thereby restrict the rate of fluid flow into and from said frictional coupling clutch while a torque transmitted by the frictional coupling clutch is changed.

9. A hydraulic control apparatus according to claim 8, wherein said flow control means includes a flow control valve for controlling the rate of fluid flow through said other fluid passage, and a linear solenoid valve for producing a controlled output pressure which is regulated by said command from said electronic control means, for operating said flow control valve.

10. A hydraulic control apparatus according to claim 9, wherein said flow control valve includes a spool which has an intermediate position as a restricting position between opposite ends of an operating stroke thereof each of which defines a non-restricting position, said flow control valve restricting the rate of fluid flow through said other fluid passage when said spool is placed in said intermediate position, and not restricting said rate of fluid flow when said spool is placed in one of two end positions corresponding to said opposite ends.

11. A hydraulic control apparatus according to claim 9, wherein said linear solenoid valve is operated with a duty cycle thereof being controlled by said command from said electronic control means.

12. A hydraulic control apparatus according to claim 9, wherein said electronic control means controls said linear solenoid valve such that the linear solenoid valve is operated with a predetermined duty cycle which is determined by a stored predetermined relationship between said duty cycle and a throttle valve opening.

13. A hydraulic control apparatus according to claim 9, further comprising a flow restrictor disposed between said frictional coupling clutch and said flow control valve, and an accumulator connected to a passage between said flow restrictor and said flow control valve.

14. A hydraulic control apparatus for controlling a shifting action of a hydraulically operated frictional coupling clutch of an automatic transmission connected to an engine of a motor vehicle, to shift the automatic transmission between a neutral position thereof and a first-speed forward drive position, in response to an operation of a shift lever, with a minimum shifting shock, said clutch being engaged to establish said first-speed position, said hydraulic control apparatus comprising:

a shift lever valve operable in response to the operation of said shift lever between a first position for supplying a fluid to said frictional coupling clutch for engagement thereof to establish said first-speed forward drive position and a second position for discharging the fluid from the frictional coupling clutch for disengagement thereof;

flow control means disposed between said shift lever valve and said frictional coupling clutch for controlling a rate of flow of the fluid therethrough;

a fail-safe fluid passage disposed between said shift lever valve and said frictional coupling clutch for maintaining fluid communication between the shift lever valve and the frictional coupling clutch irrespective of an operating position of said flow control means;

electronic control means for controlling said flow control means so as to restrict the rate of fluid flow into or from said frictional coupling clutch after an engaging or disengaging action of said frictional coupling clutch is actually started; and a first and a second fluid passage which are disposed in parallel connection with each other, between said shift lever valve and said frictional coupling clutch, one of said first and second fluid passages comprising said fail-safe fluid passage, the other of said first and second fluid passages having a lower fluid flow resistance than said one fluid passage.

15. A hydraulic control apparatus for controlling a shifting action of a hydraulically operated frictional coupling clutch of an automatic transmission connected to an engine of a motor vehicle, to shift the automatic transmission between a neutral position thereof and a first-speed forward drive position, in response to an operation of a shift lever, with a minimum shifting shock, said clutch being engaged to establish said first-speed position, said hydraulic control apparatus comprising:

a shift lever valve operable in response to the operation of said shift lever between a first position for supplying a fluid to said frictional coupling clutch for engagement thereof to establish said first-speed forward drive position and a second position for discharging the fluid from the frictional coupling clutch for disengagement thereof;

flow control means disposed between said shift lever valve and said frictional coupling clutch for controlling a rate of flow of the fluid therethrough;

a fail-safe fluid passage disposed between said shift lever valve and said frictional coupling clutch for maintaining fluid communication between the shift lever valve and the frictional coupling clutch irrespective of an operating position of said flow control means;

electronic control means for controlling said flow control means so as to restrict the rate of fluid flow into or from said frictional coupling clutch after an engaging or disengaging action of said frictional coupling clutch is actually started; and a first and a second fluid passage which are disposed in parallel connection with each other, between said shift lever valve and said frictional coupling clutch, one of said first and second fluid passages comprising said fail-safe fluid passage, said one of the first and second fluid passages including a first fixed flow restrictor and a second fixed flow restrictor equipped with flow checking means, said first and second fixed flow restrictors being provided between said flow control means and said shift lever valve.

* * * * *